United States Patent
Huang

(10) Patent No.: US 12,119,645 B2
(45) Date of Patent: Oct. 15, 2024

(54) METHOD AND DEVICE FOR ON-GRID AND OFF-GRID DISPATCH, AND ENERGY STORAGE AIR-CONDITIONING SYSTEM

(71) Applicant: Gree Electric Appliances, Inc. of Zhuhai, Guangdong (CN)

(72) Inventor: Songru Huang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 0 days.

(21) Appl. No.: 18/016,187

(22) PCT Filed: Sep. 13, 2021

(86) PCT No.: PCT/CN2021/117899
§ 371 (c)(1),
(2) Date: Jan. 13, 2023

(87) PCT Pub. No.: WO2022/110977
PCT Pub. Date: Jun. 2, 2022

(65) Prior Publication Data
US 2023/0275428 A1    Aug. 31, 2023

(30) Foreign Application Priority Data
Nov. 24, 2020   (CN) .......................... 202011331089.1

(51) Int. Cl.
*H02J 3/00*   (2006.01)
*H02J 3/28*   (2006.01)

(52) U.S. Cl.
CPC ............ *H02J 3/00125* (2020.01); *H02J 3/28* (2013.01)

(58) Field of Classification Search
CPC .. H02J 3/00125; H02J 3/28; H02J 3/32; H02J 9/062; Y04S 20/222
See application file for complete search history.

(56) References Cited

U.S. PATENT DOCUMENTS

| 9,819,190 B2 | 11/2017 | Somani et al. |
| 2016/0028271 A1 | 1/2016 | Smith |

(Continued)

FOREIGN PATENT DOCUMENTS

| CN | 105006841 A | 10/2015 |
| CN | 106786777 A | 5/2017 |

(Continued)

OTHER PUBLICATIONS

Bo, Xin et al., "A Seamless Transfer Strategy Between Grid-connected and Islanding Operation for Photovoltaic/batttery AC/DC Microgrid", Modern Electric Power, Jun. 2018, pp. 70-76, vol. 35, No. 3.

(Continued)

*Primary Examiner* — Lincoln D Donovan
*Assistant Examiner* — Alex W Lam
(74) *Attorney, Agent, or Firm* — The Webb Law Firm

(57) ABSTRACT

A method and a device for on-grid and off-grid dispatch, and an energy storage air-conditioning system are provided. The method for on-grid and off-grid dispatch includes: causing a load to be off-grid and causing an energy storage converter to supply power to the load after determining that grid is down; determining a given power and a given voltage according to a voltage and a current of the load obtained for the last time before the grid is down; and obtaining an actual voltage and an actual current outputted by the energy storage converter; and adjusting an output parameter of the energy storage converter according to the given power and the given voltage, as well as the actual voltage and the actual current outputted by the energy storage converter.

19 Claims, 5 Drawing Sheets

(56) References Cited

U.S. PATENT DOCUMENTS

2017/0005473 A1\* 1/2017 Somani .................. H02J 3/381
2017/0288455 A1\* 10/2017 Fife ...................... G01R 31/392
2020/0287410 A1 9/2020 Zhao et al.

FOREIGN PATENT DOCUMENTS

| CN | 107994610 A | 5/2018 |
| CN | 109103935 A | 12/2018 |
| CN | 109638895 A | 4/2019 |
| CN | 110212580 A | 9/2019 |
| CN | 110943486 A | 3/2020 |
| CN | 111371340 A | 7/2020 |
| CN | 111711196 A | 9/2020 |
| CN | 112383055 A | 2/2021 |

OTHER PUBLICATIONS

Ji, Hang-hui et al., "Research on Grid-connected/Islanded Mode Seamless Transition of Dual-mode Inverter Based on Storage", Power Electronics, Oct. 2016.

\* cited by examiner

METHOD AND DEVICE FOR ON-GRID AND OFF-GRID DISPATCH, AND ENERGY STORAGE AIR-CONDITIONING SYSTEM

CROSS-REFERENCE TO RELATED APPLICATION

The present application is a U.S. National Stage Application under 35 U.S.C. § 371 of International Patent Application No. PCT/CN2021/117899, filed on Sep. 13, 2021, and claims priority to Chinese Patent Application No. 202011331089.1 filed on Nov. 24, 2020, the disclosures of which are hereby incorporated by reference herein in their entireties.

BACKGROUND OF THE INVENTION

Field of the Invention

The present invention relates to the technical field of electronic power, in particular to a method and a device for on-grid and off-grid dispatch, and an energy storage air-conditioning system.

Description of Related Art

The energy storage system which has been widely applied at present, is a favorable application system for collecting and consuming new energy in place. However, there are also some shortcomings, which results in a restricted application of the air-conditioning system. Since the energy storage system is provided, the energy storage system continues to provide power support for the load in the case of grid failure. FIG. 1 is a block view of on-grid and off-grid dispatch control in the related art known by the inventors. During the on-grid and off-grid process of the load in this solution, the switching of the converter control loop leads to certain electric energy quality fluctuations present during the switching process, which may result in tripping of the load or damage of the device in serious cases, and cause adverse effects.

SUMMARY OF THE INVENTION

In view of this, the embodiments of the present disclosure provide a method and a device for on-grid and off-grid dispatch, and an energy storage air-conditioning system, so as to solve the problem of electric energy quality fluctuation during the on-grid and off-grid switching process in the related art.

According to one aspect of the present disclosure, a method for on-grid and off-grid dispatch is provided. The method includes: causing a load to be off-grid and causing an energy storage converter to supply power to the load after determining that grid is down; determining a given power and a given voltage according to a voltage and a current of the load obtained for the last time before the grid is down; and obtaining an actual voltage and an actual current outputted by the energy storage converter; and adjusting an output parameter of the energy storage converter according to the given power and the given voltage, as well as the actual voltage and the actual current outputted by the energy storage converter.

In some embodiments, the step of determining a given power and a given voltage according to a voltage and a current of the load obtained for the last time before the grid is down includes: calculating a product of a voltage, a current and a power factor of the load obtained for the last time before the grid is down to obtain a given power; and determining a voltage of the load obtained for the last time before the grid is down as a given voltage.

In some embodiments, the step of adjusting an output parameter of the energy storage converter according to the given power and the given voltage, as well as the actual voltage and the actual current outputted by the energy storage converter includes: calculating an actual power according to the actual voltage and the actual current outputted by the energy storage converter; obtaining a direct-axis voltage adjustment parameter according to the given power, the actual power, a direct-axis component of the actual current and a direct-axis component of the actual voltage, and obtaining a quadrature-axis voltage adjustment parameter according to the given voltage, the actual voltage, a quadrature-axis component of the actual current and a quadrature-axis component of the actual voltage; obtaining an adjustment signal according to the direct-axis voltage adjustment parameter, the quadrature-axis voltage adjustment parameter and a positive sequence angle of the energy storage converter; and adjusting an output parameter of the energy storage converter according to the adjustment signal and a DC side voltage of the energy storage converter.

In some embodiments, the step of obtaining a direct-axis voltage adjustment parameter according to the given power, the actual power, a direct-axis component of the actual current and a direct-axis component of the actual voltage includes: obtaining a direct-axis component of a given current according to the given power and the actual power; obtaining a direct-axis current adjustment parameter according to the direct-axis component of the given current and the direct-axis component of the actual current; and obtaining a direct-axis voltage adjustment parameter according to the direct-axis current adjustment parameter, the direct-axis component of the actual voltage and a first decoupling quantity, wherein the first decoupling quantity is obtained by decoupling the quadrature-axis component of the actual current.

In some embodiments, the step of obtaining a direct-axis component of a given current according to the given power and the actual power includes: calculating a difference between the given power and the actual power to obtain a power error value; and performing proportional integral adjustment on the power error value to obtain a direct-axis component of the given current.

In some embodiments, the step of obtaining a direct-axis current adjustment parameter according to the direct-axis component of the given current and the direct-axis component of the actual current includes: calculating a difference between the direct-axis component of the given current and the direct-axis component of the actual current to obtain a direct-axis component error value; and performing proportional integral adjustment on the direct-axis component error value to obtain the direct-axis current adjustment parameter.

In some embodiments, a formula on which the step of obtaining the direct-axis voltage adjustment parameter according to the direct-axis current adjustment parameter, a direct-axis component of the actual voltage and a first decoupling quantity is based is: $Vgd=Ud-Id1+A1$, where $Vgd$ is the direct-axis voltage adjustment parameter, $Id1$ is the direct-axis current adjustment parameter, $Ud$ is the direct-axis component of the actual voltage, and $A1$ is the first decoupling quantity.

In some embodiments, the step of obtaining a quadrature-axis voltage adjustment parameter according to the given voltage, the actual voltage, a quadrature-axis component of the actual current and a quadrature-axis component of the actual voltage includes: obtaining a quadrature-axis component of a given current according to the given voltage and the actual voltage; obtaining a quadrature-axis current adjustment parameter according to the quadrature-axis component of the given current and the quadrature-axis component of the actual current; and obtaining the quadrature-axis voltage adjustment parameter according to the quadrature-axis current adjustment parameter, the quadrature-axis component of the actual voltage and a second decoupling quantity, wherein the second decoupling quantity is obtained by decoupling the direct-axis component of the actual current.

In some embodiments, the step of obtaining a quadrature-axis component of a given current according to the given voltage and the actual voltage includes: calculating a difference between the given voltage and the actual voltage to obtain a voltage error value; and performing proportional integral adjustment on the voltage error value to obtain a quadrature-axis component of the given current.

In some embodiments, the step of obtaining a quadrature-axis current adjustment parameter according to the quadrature-axis component of the given current and the quadrature-axis component of the actual current includes: calculating a difference between the quadrature-axis component of the given current and the quadrature-axis component of the actual current to obtain a quadrature-axis component error value; and performing proportional integral adjustment on the quadrature-axis component error value to obtain the quadrature-axis current adjustment parameter.

In some embodiments, a formula on which the step of obtaining the quadrature-axis voltage adjustment parameter according to the quadrature-axis current adjustment parameter, the quadrature-axis component of the actual voltage and a second decoupling quantity is based is: $Vgq=Uq+Iq1+A2$, where $Vgq$ is the quadrature-axis voltage adjustment parameter, $Iq1$ is the quadrature-axis current adjustment parameter, $Uq$ is the quadrature-axis component of the actual voltage, and $A2$ is the second decoupling quantity.

In some embodiments, the step of obtaining an adjustment signal according to the direct-axis voltage adjustment parameter, the quadrature-axis voltage adjustment parameter and a positive sequence angle of the energy storage converter includes: performing inverse Park transform based on the direct-axis voltage adjustment parameter, the quadrature-axis voltage adjustment parameter and a positive sequence angle of the energy storage converter to obtain an adjustment signal.

In some embodiments, the step of adjusting an output parameter of the energy storage converter according to the adjustment signal and a DC side voltage of the energy storage converter includes: performing space vector pulse width modulation based on the adjustment signal and a DC side voltage of the energy storage converter to obtain a pulse signal; and adjusting a duty ratio of a power switch in the energy storage converter according to the pulse signal so as to adjust an output parameter of the energy storage converter.

In some embodiments, after the step of obtaining an actual voltage and an actual current outputted by the energy storage converter, the method further includes: performing Clark transform on the actual voltage to obtain an $\alpha$-axis voltage component and a $\beta$-axis voltage component; performing phase-locking process based on the $\alpha$-axis voltage component and the $\beta$-axis voltage component to obtain a positive sequence angle of the energy storage converter; and performing Park transform based on the $\alpha$-axis voltage component, the $\beta$-axis voltage component and the positive sequence angle to obtain the direct-axis component of the actual voltage and the quadrature-axis component of the actual voltage.

In some embodiments, the method further includes: performing Clark transform on the actual current to obtain an $\alpha$-axis current component and a $\beta$-axis current component; and performing Park transform based on the $\alpha$-axis current component, the $\beta$-axis current component and the positive sequence angle to obtain the direct-axis component of the actual current and the quadrature-axis component of the actual current.

In some embodiments, the step of determining that the grid is down includes: judging whether a grid voltage meets a first preset condition and judging whether a grid current meets a second preset condition; and determining that the grid is down if at least one of the grid voltages meeting the first preset condition and the grid current meeting the second preset condition is true, otherwise determining that grid is not down.

In some embodiments, the first preset condition is that the grid voltage is less than a first threshold, and the second preset condition is that the grid current is less than a second threshold.

The present disclosure also provides a device for on-grid and off-grid dispatch applied to the above-described method for on-grid and off-grid dispatch, wherein the device includes: a control module configured to cause a load to be off-grid and cause an energy storage converter to supply power to the load after determining that the grid is down; a parameter determining module configured to determine a given power and a given voltage according to a voltage and a current of the load obtained for the last time before the grid is down; an obtaining module configured to obtain an actual voltage and an actual current outputted by the energy storage converter; and an adjusting module configured to adjust an output parameter of the energy storage converter according to the given power and the given voltage, as well as the actual voltage and the actual current outputted by the energy storage converter.

The present disclosure also provides an energy storage air-conditioning system, including an energy storage converter and the above-described device for on-grid and off-grid dispatch.

The present disclosure also provides a computer readable storage medium having a computer program stored thereon that, when executed by a processor, implements the above-described method for on-grid and off-grid dispatch.

By applying the technical solution of the disclosure, after determining that the grid is down, the load is caused to be off-grid, and the energy storage converter is caused to supply power to the load; a given power and a given voltage are determined according to the voltage and current of the load obtained for the last time before the grid is down; and an actual voltage and an actual current outputted by the energy storage converter are obtained; and the output parameter of the energy storage converter are adjusted according to the given power, the given voltage and the actual voltage and the actual current outputted by the energy storage converter. In this way, it is possible to realize the seamless shifting from an on-grid state to an off-grid state, thereby avoiding the electric energy quality fluctuation during the shifting process, and improving the stability.

DESCRIPTION OF THE INVENTION

Figure 1:
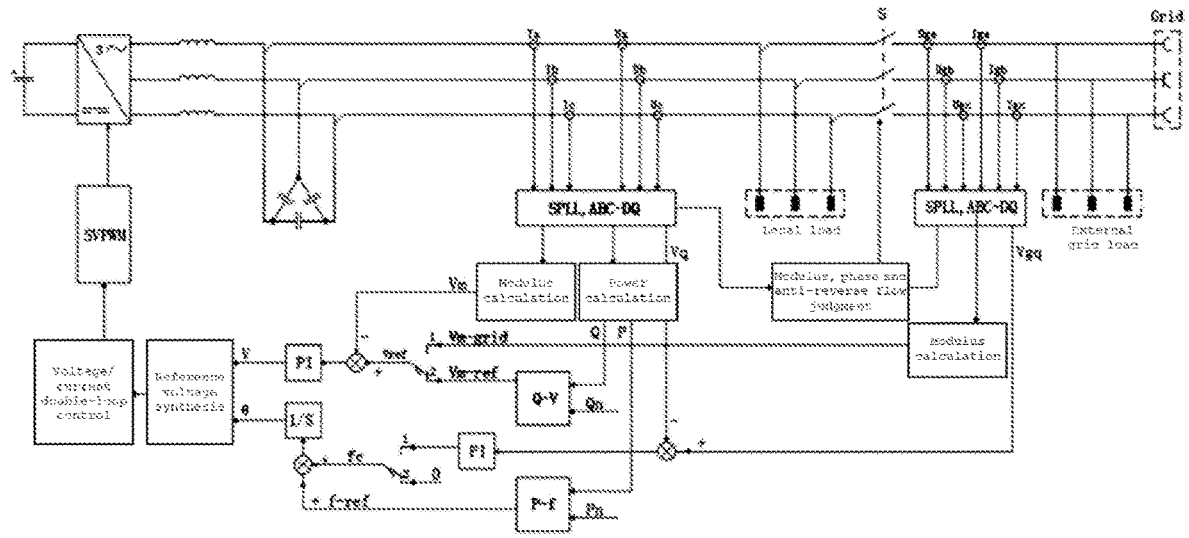
FIG. 1 is a block view of on-grid/off-grid scheduling control in the related art.

In order to make the purpose, technical solution and advantages of the present disclosure more explicit, the present disclosure will be further described in detail in conjunction with the accompanying drawings. Apparently, the embodiments described are only some of the embodiments of the present disclosure, rather than all of them. Based on the embodiments of the present disclosure, all the other embodiments obtained by those of ordinary skills in the art without inventive efforts to be involved fall into the protection scope of the present disclosure.

The terms used in the embodiments of the present disclosure are only for the purpose of describing specific embodiments, rather than limiting the present disclosure. The singular forms of "a", "said" and "the" used in the embodiments of the present disclosure and the appended claims are also intended to include multiple forms, and unless other meanings are explicitly indicated in the context, the term "a plurality of" generally includes at least two.

It should be understood that, the term "and/or" used herein is only an associated relationship to describe associated objects, which means that there may be three relationships, for example, A and/or B, which may mean such three circumstances as A present alone, A and B present at the same time, and B present alone. In addition, the character "/" herein generally indicates that the contextual objects are in an "or" relationship.

It should be understood that, although the terms such as "first", "second", and "third" might be used to describe the switches in the embodiments of the present disclosure, these switches should not be limited to these terms. These terms are only used to distinguish different switches. For example, without departing from the scope of the embodiments of the present disclosure, the first switch may also be referred to as the second switch, and similarly, the second switch may also be referred to as the first switch.

Depending on the context, the words "if" and "in the case where" as used here may be interpreted as "when" or "as" or "in response to determining" or "in response to detecting". Similarly, depending on the context, the phrases "if determining" or "if detecting (stated conditions or events)" may be interpreted as "when determining" or "in response to determining" or "when detecting (stated conditions or events)" or "in response to detecting (stated conditions or events)".

It should also be noted that, the terms "including", "comprising" or any other variation thereof is intended to cover non-exclusive inclusions, so that a product or device that includes a series of elements includes not only those elements, but also other elements that are not explicitly listed, or elements inherent to such product or device. In the case where there are no more restrictions, an element defined by the phrase "including one . . . " does not exclude another identical element present in the product or device including the element.

The alternative embodiments of the present disclosure will be described in detail below in conjunction with the accompanying drawings.

Embodiment 1

Figure 2:
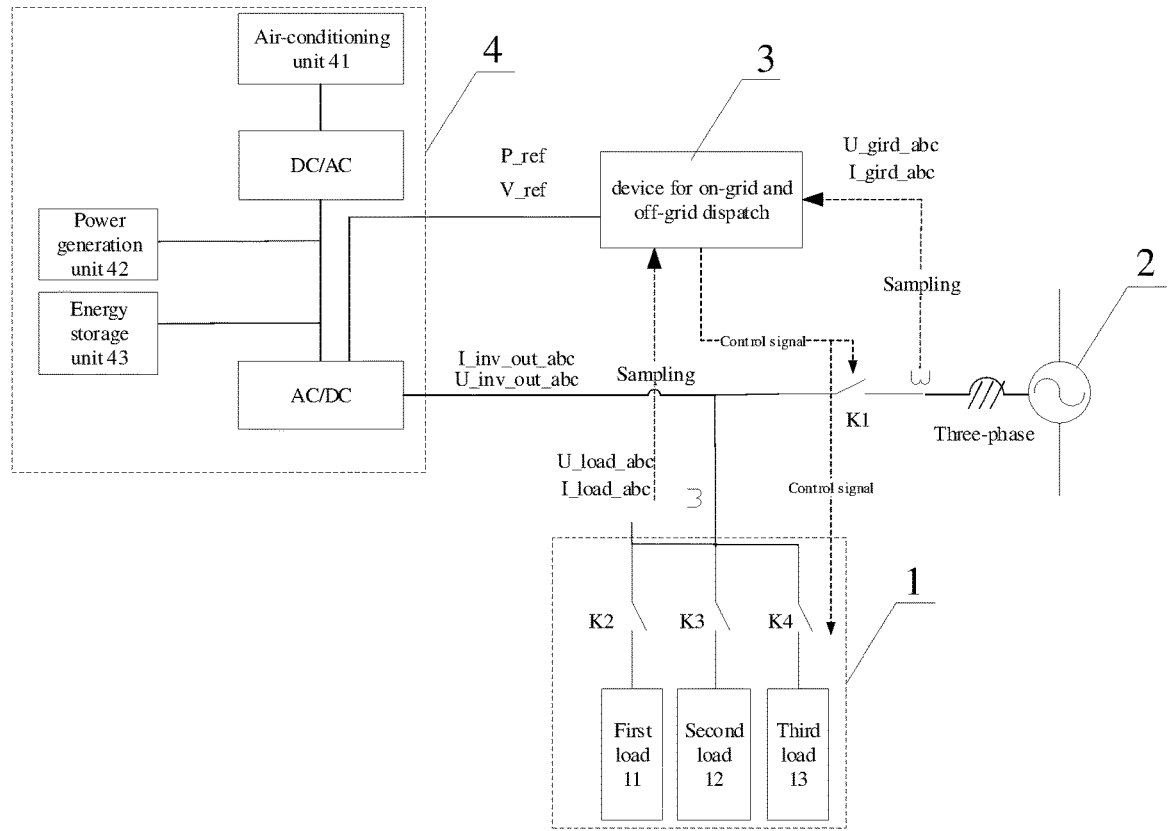
FIG. 2 is a structural view of an energy storage air-conditioning system according to an embodiment of the present disclosure.

The present embodiment provides a method for on-grid and off-grid dispatch, which is applied to an energy storage air-conditioning system. FIG. 2 is a structural view of an energy storage air-conditioning system according to an embodiment of the present disclosure. As shown in FIG. 2, the energy storage air-conditioning system includes: a load 1, a grid 2, a device for on-grid and off-grid dispatch 3, and an energy storage system 4, and a first switch K1 is provided between the load 1 and the grid 2. The energy storage system 4 includes an air-conditioning unit 41, a power generation unit 42 and an energy storage unit 43. The power generation unit 42 is connected to the air-conditioning unit 41 through the DC/AC converter, and the energy storage unit 43 is connected to the load 1 through the AC/DC converter, so as to supply power to the load 1 when the load 1 is off-grid. This AC/DC converter is an energy storage converter. The load 1 may include a first load 11, a second load 12 and a third load 13, a second switch K2 is provided between the first load 11 and the AC/DC converter, a third switch K3 is provided between the second load 12 and the AC/DC converter, and a fourth switch K4 is provided between the third load 13 and the AC/DC converter.

Figure 3:
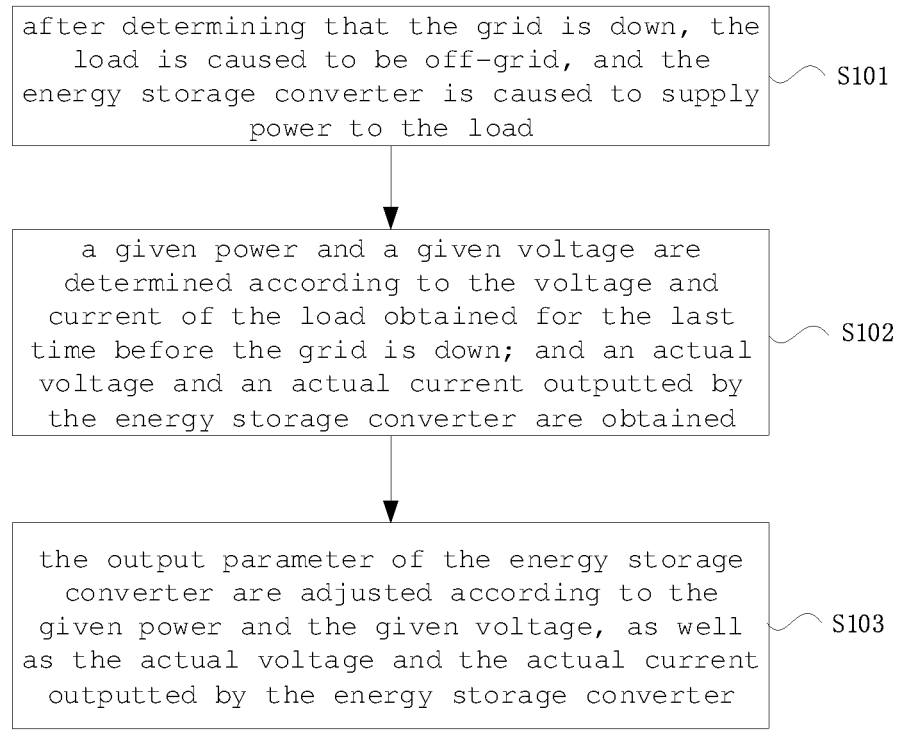
FIG. 3 is a flowchart of a method for on-grid and off-grid dispatch according to an embodiment of the present disclosure.

FIG. 3 is a flowchart of a method for on-grid and off-grid dispatch according to an embodiment of the present disclosure. As shown in FIG. 3, the method includes that:

In S101, after determining that the grid is down, the load is caused to be off-grid, and the energy storage converter is caused to supply power to the load.

When the load is in an on-grid state, the device for on-grid and off-grid dispatch 3 obtains the grid voltage U_grid_abc and the grid current I_grid_abc, and the voltage U_load_abc and the current I_load_abc of the load 1 in real time. When the grid voltage U_grid_abc is less than the first threshold (for example, 0V) and/or the grid current I_grid_abc is less than the second threshold (for example, 0A), the device 3 for on-grid and off-grid dispatch determines that the grid is down, so as to cause the first switch K1 to be off, and cause the second switch K2, the third switch K3, and the fourth switch K4 to remain in the original state (for example, if the second switch K2 and the third switch K3 are on, and the fourth switch K4 is off before the grid is down, the device 3 for on-grid and off-grid dispatch causes the fourth switch K4 to remain off during a power interruption failure of the grid), and at the same time, cause the energy storage unit 43 to supply power to the load through the AC/DC converter.

In S102, a given power and a given voltage are determined according to the voltage and current of the load obtained for the last time before the grid is down; and an actual voltage and an actual current outputted by the energy storage converter are obtained.

After the load is caused to be off-grid, a given power and a given voltage are determined according to the voltage and current of the load obtained for the last time before the grid is down, and a given power and a given voltage are sent to the AC/DC converter.

In S103, the output parameter of the energy storage converter is adjusted according to the given power and the given voltage, as well as the actual voltage and the actual current outputted by the energy storage converter.

According to the given power and the given voltage, as well as the actual voltage and the actual current outputted by the energy storage converter, double-loop PI adjustment is performed to control the output parameter of the AC/DC converter.

In the method for on-grid and off-grid dispatch of the present embodiment, the load is caused to be off-grid and the energy storage converter is caused to supply power to the load after determining that the grid is down; a given power and a given voltage are determined according to the voltage and current of the load obtained for the last time before the grid is down; and an actual voltage and an actual current outputted by the energy storage converter are obtained; the output parameter of the energy storage converter are adjusted according to the given power and the given voltage, and the actual voltage and the actual current outputted by the energy storage converter. In this way, it is possible to realize the seamless shifting from an on-grid state to an off-grid state, thereby avoiding the electric energy quality fluctuation during the shifting process, and improving the stability.

Embodiment 2

The present embodiment provides another method for on-grid and off-grid dispatch, wherein there is a specific quantitative relationship between power, current, voltage and power factor. In the present embodiment, the above-described step S102 includes: calculating a product of the voltage U_load_abc, the current I_load_abc and the power factor of the load obtained for the last time before the grid is down to obtain a given power P_ref; determining the voltage of the load obtained for the last time before the grid is down as the given voltage V_ref.

Figure 4:
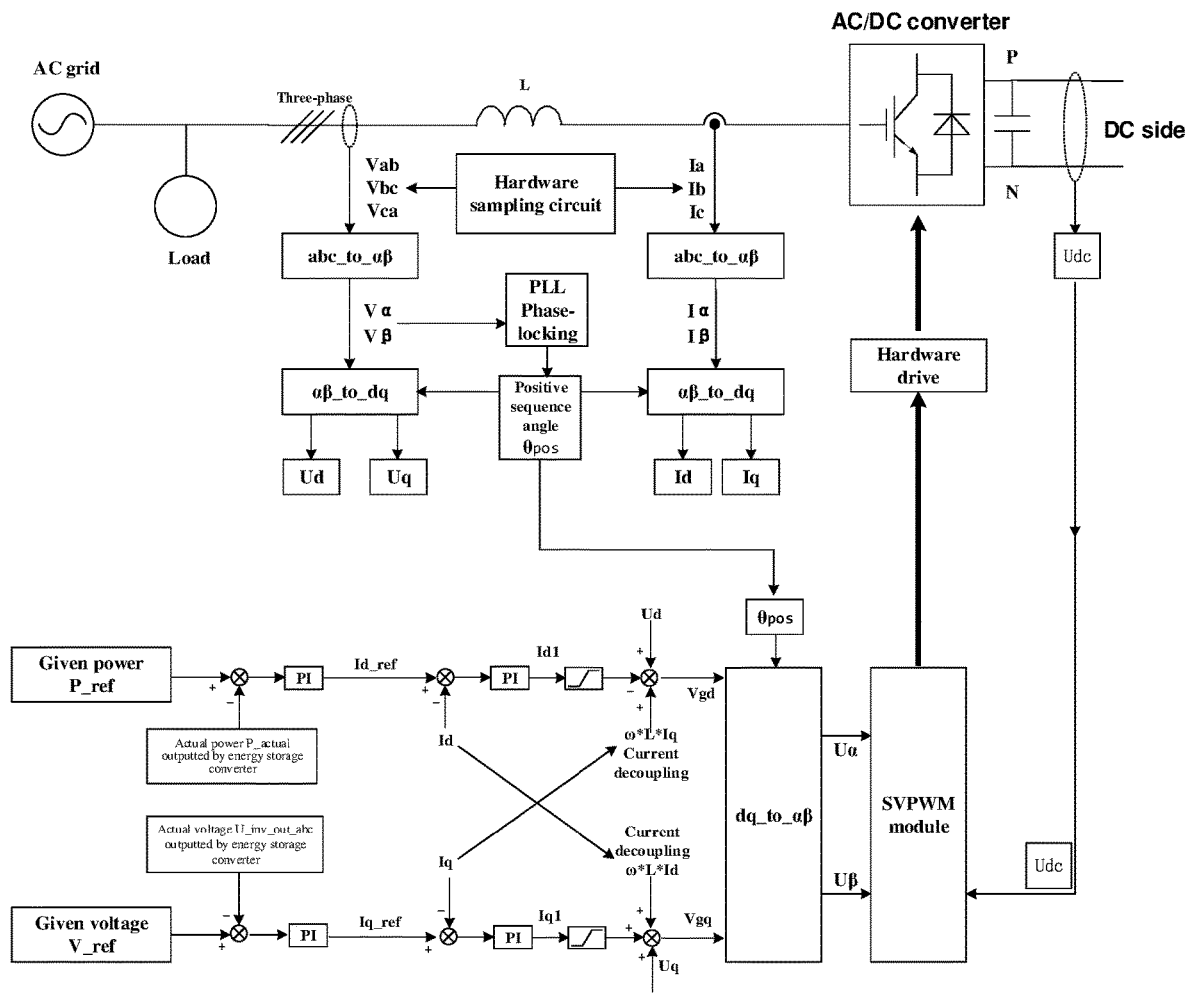
FIG. 4 is a block view of output parameter adjustment according to an embodiment of the present disclosure.

FIG. 4 is a block view of outputted parameter adjustment according to an embodiment of the present disclosure. In order to achieve double-loop PI adjustment to obtain an accurate adjustment effect, as shown in FIG. 4, the step of adjusting the output parameter of the energy storage converter according to the given power P_ref, the given voltage V_ref and the actual voltage and the actual current outputted by the energy storage converter specifically includes: calculating an actual power according to the actual voltage and the actual current outputted by the energy storage converter; obtaining a direct-axis voltage adjustment parameter according to the given power, the actual power, a direct-axis component of the actual current and a direct-axis component of the actual voltage, and obtaining a quadrature-axis voltage adjustment parameter according to the given voltage, the actual voltage, a quadrature-axis component of the actual current and a quadrature-axis component of the actual voltage; obtaining an adjustment signal according to the direct-axis voltage adjustment parameter, the quadrature-axis voltage adjustment parameter and a positive sequence angle of the energy storage converter; and adjusting the output parameter of the energy storage converter according to the adjustment signal and the DC side voltage of the energy storage converter.

According to the actual voltage U_inv_out_abc and the actual current I_inv_out_abc outputted by the energy storage converter, the actual power P_actual is calculated. Similar to the calculation of the given power P_ref, the product of the actual voltage U_inv_out_abc, the actual current I_inv_out_abc and the power factor, i.e., the actual power P_actual, is calculated.

According to the given power P_ref, the actual power P_actual, the direct-axis component Id of the actual current and the direct-axis component Ud of the actual voltage, the direct-axis voltage adjustment parameter Vgd is obtained. The step includes: obtaining the direct-axis component Id_ref of a given current according to the given power P_ref and the actual power P_actual, wherein in a specific implementation, a difference between the given power P_ref and the actual power P_actual is calculated to obtain a power error value, and a proportional integral adjustment is performed on the power error value to obtain the direct-axis component Id_ref of the given current; obtaining a direct-axis current adjustment parameter Id1 according to the direct-axis component Id_ref of the given current and the direct-axis component Id of the actual current, and specifically, calculating a difference between the direct-axis component Id_ref of the given current and the direct-axis component Id of the actual current to obtain a direct-axis component error value; performing a proportional integral adjustment on the direct-axis component error value to obtain a direct-axis current adjustment parameter Id1; obtaining the direct-axis voltage adjustment parameter Vgd according to the direct-axis current adjustment parameter Id1, the direct-axis component Ud of the actual voltage, and the first decoupling quantity A1, wherein the above-described first decoupling quantity A1 is obtained by decoupling the quadrature-axis component Iq of the actual current, so that the quadrature-axis current is controlled by both the quadrature-axis voltage and the direct-axis voltage, and the direct-axis current in the same way. This indicates that there is coupling between the direct-axis and the quadrature-axis, and both of them are not independent. Therefore, in a specific implementation, the formula on which the step of obtaining the direct-axis voltage adjustment parameter Vgd according to the direct-axis current adjustment parameter Id1, the direct-axis component Ud of the actual voltage and the first decoupling quantity A1 is based is: $Vgd=Ud-Id1+A1$; $A1=\omega*L*Iq$, where $\omega$ is an angular velocity of alternating current and L is an inductance.

According to the given voltage V_ref, the actual voltage U_inv_out_abc, the quadrature-axis component Iq of the actual current and the quadrature-axis component Uq of the actual voltage, the quadrature-axis voltage adjustment parameter Vgq is obtained. The step includes: obtaining the quadrature-axis component Iq_ref of a given current according to the given voltage V_ref and the actual voltage U_inv_out_abc, and specifically, calculating a difference between the given voltage V_ref and the actual voltage U_inv_out_abc to obtain a voltage error value, and performing a proportional integral adjustment on the voltage error value to obtain the quadrature-axis component Iq_ref of the given current; obtaining the quadrature-axis current adjustment parameter Iq1 according to the quadrature-axis component Iq_ref of the given current and the quadrature-axis component Iq of the actual current, and specifically, calculating a difference between the quadrature-axis component Iq_ref of the given current and the quadrature-axis component Iq of the actual current to obtain the quadrature-axis component error value; performing a proportional integral adjustment on the quadrature-axis component error value to obtain a quadrature-axis current adjustment parameter Iq1; and obtaining the quadrature-axis voltage adjustment parameter Vgq according to the quadrature-axis current adjustment parameter Iq1, the quadrature-axis component Uq of the actual voltage and the second decoupling quantity A2, wherein the above-described second decoupling quantity A2 is obtained by decoupling the direct-axis component Id of the actual current, and according to the above as described, there is coupling between the direct-axis and the quadrature-axis and both of them are not independent. Therefore, when the quadrature-axis voltage adjustment parameter Vgq is obtained according to the quadrature-axis current adjustment parameter Iq1, the quadrature-axis component Uq of the actual voltage and the second decoupling quantity A2, the formula on which it is based is: Vgq=Uq+Iq1+A2; A2=ω*L*Id, where ω is an angular velocity of alternating current and L is an inductance.

It should be noted that, the step of obtaining the direct-axis voltage adjustment parameter Vgd according to the given power P_ref, the actual power P_actual, the direct-axis component Id of the actual current and the direct-axis component Ud of the actual voltage and the step of obtaining the quadrature-axis voltage adjustment parameter Vgq according to the given voltage V_ref, the actual voltage U_inv_out_abc, the quadrature-axis component Ig of the actual current and the quadrature-axis component Uq of the actual voltage may be performed simultaneously or sequentially, and the performing sequence is not limited.

The step of obtaining the adjustment signal according to the direct-axis voltage adjustment parameter Vgd, the quadrature-axis voltage adjustment parameter Vgq and the positive sequence angle θpos of the energy storage converter specifically includes: performing inverse Park transform based on the direct-axis voltage adjustment parameter Vgd, the quadrature-axis voltage adjustment parameter Vgq and the positive sequence angle θpos of the energy storage converter to obtain the adjustment signal, wherein the adjustment signal includes α-axis voltage adjustment quantity Uα and β-axis voltage adjustment quantity Uβ.

The step of adjusting the output parameter of the energy storage converter according to the above-described adjustment signal and the DC side voltage of the energy storage converter specifically includes: performing space vector pulse width modulation (SVPWM) based on the adjustment signal and the DC side voltage of the energy storage converter to obtain a pulse signal; and adjusting the duty ratio of the power switch in the energy storage converter according to the above-described pulse signal, so as to further adjust the output parameter of the energy storage converter.

Since the positive sequence angle θpos of the energy storage converter, the direct-axis component and the quadrature-axis component of the actual current of the energy storage converter need to be used in the above-described steps, after the step of obtaining the actual voltage U_inv_out_abc and the actual current I_inv_out_abc outputted by the energy storage converter, the above-described method also includes: performing Clark transform on the above-described actual voltage U_inv_out_abc to obtain the α-axis voltage component Vα and the β-axis voltage component Vβ; performing phase-locking process based on the α-axis voltage component Vα and the β-axis voltage component Vβ to obtain the positive sequence angle θpos of the energy storage converter; and performing Park transform based on the α-axis voltage component Vα, the β-axis voltage component Vβ and the positive sequence angle θpos, to obtain the direct-axis component Ud of the actual voltage and the quadrature-axis component Uq of the actual voltage.

The present embodiment also includes: performing Clark transform on the above-described actual current I_inv_out_abc to obtain the α-axis current component Iα and the β-axis current component U; and performing Park transform based on the α-axis current component Iα, the β-axis current component Iβ and the positive sequence angle θpos to obtain the direct-axis component Id of the actual current and the quadrature-axis component Iq of the actual current.

Before the grid is down, the grid voltage and the grid current may gradually decrease, so as to determine that the grid is down. The step of determining the grid is down includes: judging whether the grid voltage meets a first preset condition and judging whether the grid current meets a second preset condition; determining that the grid is down if at least one of the grid voltages meeting the first preset condition and the grid current meeting the second preset condition is true, and otherwise, determining that the grid is not down. The first preset condition is that: the grid voltage is less than the first threshold (for example, 5V) and the grid current is less than the second threshold (for example, 5A).

Embodiment 3

Figure 5:
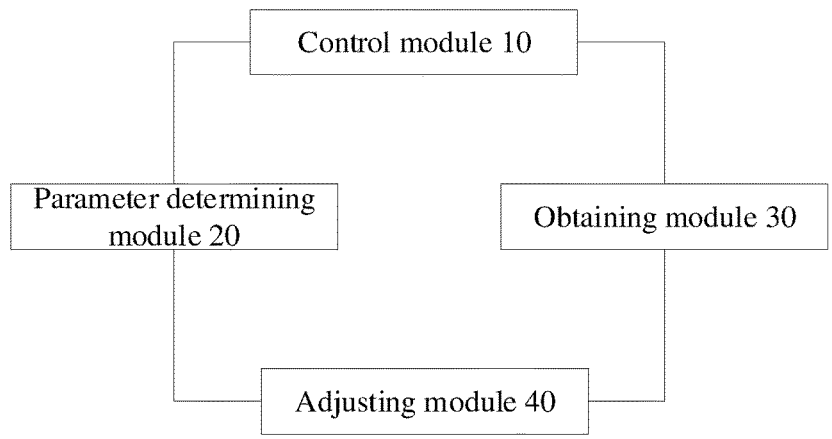
FIG. 5 is a structural view of a device for on-grid and off-grid dispatch according to an embodiment of the present disclosure.

The present embodiment provides a device for on-grid and off-grid dispatch, which is applied to the above-described method for on-grid and off-grid dispatch. FIG. 5 is a structural view of a device for on-grid and off-grid dispatch according to an embodiment of the present disclosure. As shown in FIG. 5, the device includes: a control module 10, a parameter determining module 20, an obtaining module 30 and an adjusting module 40.

The control module 10 is configured to cause the load to be off-grid and cause the energy storage converter to supply power to the load after determining that the grid is down. When the load is in an on-grid state, the device 3 for on-grid and off-grid dispatch obtains the grid voltage U_grid_abc and the grid current I_grid_abc, and the voltage U_load_abc and the current I_load_abc of the load 1 in real time. When the grid voltage U_grid_abc is less than the first threshold (for example, 0V) and/or the grid current I_grid_abc is less than the second threshold (for example, 0A), the device 3 for on-grid and off-grid dispatch determines that the grid is down, so as to cause the first switch K1 to be off, and cause the second switch K2, the third switch K3, and the fourth switch K4 to remain in the original state (for example, if the second switch K2 and the third switch K3 are on, and the fourth switch K4 is off before the grid is down, the device 3 for on-grid and off-grid dispatch causes the fourth switch K4 to remain off during a power interruption failure of the grid), and at the same time, cause the energy storage unit 43 to supply power to the load through the AC/DC converter.

The parameter determining module 20 is configured to determine the given power P_ref and the given voltage V_ref from the voltage and the current of the load obtained for the last time before the grid is down. After causing the load to be off-grid, the given power P_ref and the given voltage V_ref are determined according to the voltage and the current of the load obtained for the last time before the grid is down, and the given power P_ref and the given voltage V_ref are sent to the AC/DC converter.

The obtaining module 30 is configured to obtain the actual voltage U_inv_out_abc and the actual current I_inv_out_abc outputted by the energy storage converter.

The adjusting module 40 is configured to adjust the output parameter of the energy storage converter according to the given power P_ref, the given voltage V_ref, and the actual voltage U_inv_out_abc and the actual current I_inv_out_abc outputted by the energy storage converter. According to the given power P_ref, the given voltage V_ref, the actual voltage U_inv_out_abc and the actual current outputted by the energy storage converter, double-loop PI adjustment is performed to control the output parameter of the AC/DC converter (i.e., the above-described energy storage converter).

According to the device for on-grid and off-grid dispatch of the present embodiment, the control module 10 causes the load to be off-grid after determining that the grid is down, and causes the energy storage converter to supply power to the load; the parameter determining module 20 determines the given power P_ref and the given voltage v_ref according to the voltage and the current of the load obtained for the last time before the grid is down; the obtaining module 30 obtains the actual voltage U_inv_out_abc and the actual current I_inv_out_abc outputted by the energy storage converter; and the adjusting module 40 adjusts the output parameter of the energy storage converter according to the given power P_ref, the given voltage V_ref, the actual voltage U_inv_out_abc and the actual current I_inv_out_abc outputted by the energy storage converter. In this way, it is possible to realize the seamless shifting from an on-grid state to an off-grid state, thereby avoiding the electric energy quality fluctuation during the shifting process and improving the stability.

Embodiment 4

Figure 6:
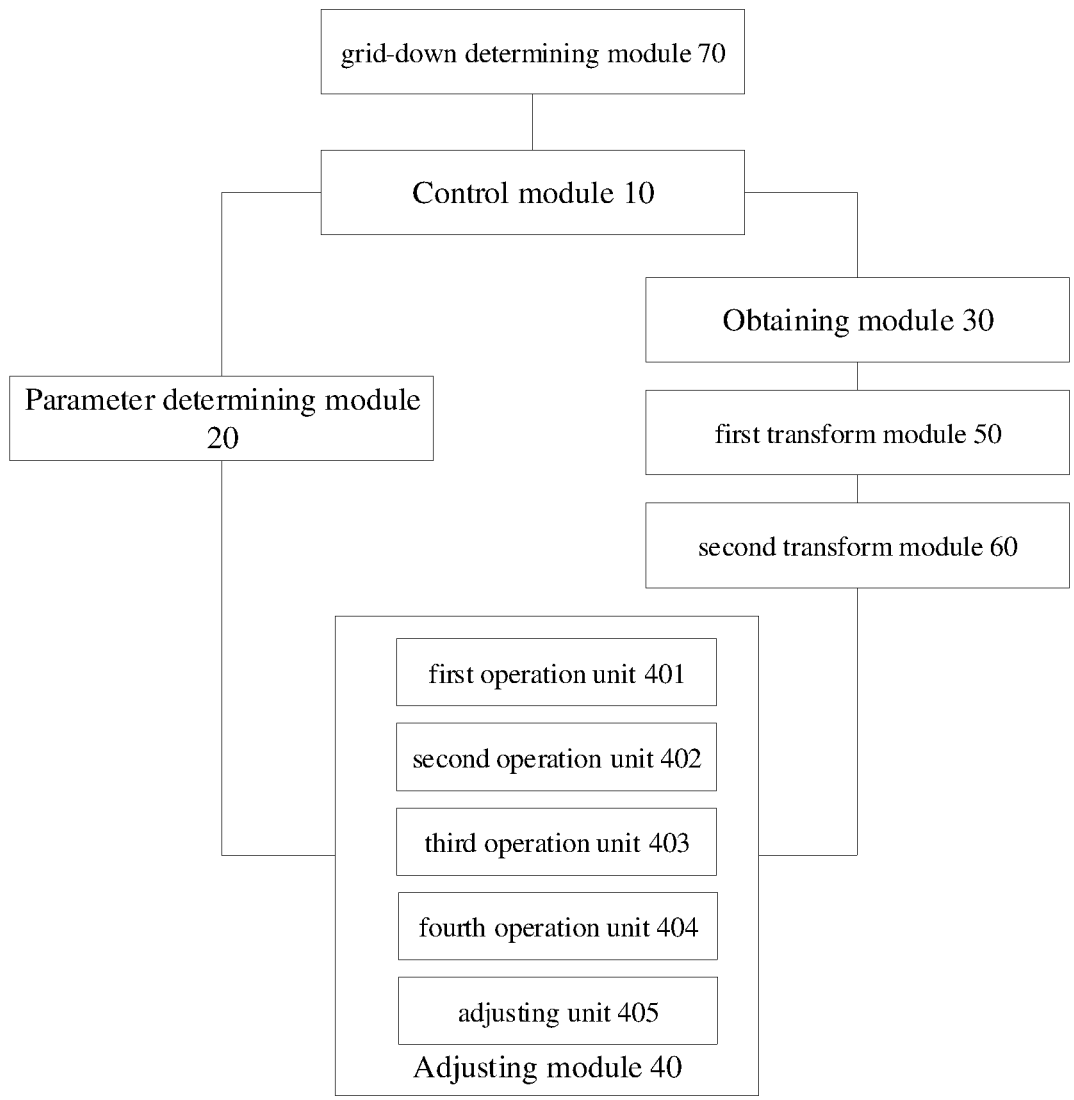
FIG. 6 is a structural view of a device for on-grid and off-grid dispatch according to another embodiment of the present disclosure.

The present embodiment provides another device for on-grid and off-grid dispatch. FIG. 6 is a structural view of a device for on-grid and off-grid dispatch according to another embodiment of the present disclosure. As shown in FIG. 6, the parameter determining module 20 includes: a first determining unit for calculating a product of the voltage, the current and the power factor obtained for the last time before the grid is down to obtain the given power P_ref; and a second determining unit for determining a voltage of the load obtained for the last time before the grid is down as the given voltage V_ref.

In some embodiments, the adjusting module 40 includes: a first operation unit 401, a second operation unit 402, a third operation unit 403, a fourth operation unit 404 and an adjusting unit 405.

The first operation unit 401 is configured to calculate the actual power P_actual according to the actual voltage U_inv_out_abc and the actual current I_inv_out_abc outputted by the energy storage converter. Similar to the calculation of the given power P_ref, the product of the actual voltage U_inv_out_abc, the actual current I_inv_out_abc and the power factor, i.e., the actual power P_actual, is calculated.

The second calculation unit 402 is configured to obtain the direct-axis voltage adjustment parameter Vgd according to the given power P_ref, the actual power P_actual, the direct-axis component Id of the actual current and the direct-axis component Ud of the actual voltage. In some embodiments, the second calculation unit 402 is specifically configured to: obtain the direct-axis component Id_ref of a given current according to the given power P_ref and the actual power P_actual, wherein in a specific implementation, a difference between the given power P_ref and the actual power P_actual is calculated to obtain a power error value, and a proportional integral adjustment is performed on the power error value to obtain the direct-axis component Id_ref of the given current; obtain a direct-axis current adjustment parameter Id1 according to the direct-axis component Id_ref of the given current and the direct-axis component Id of the actual current, and specifically, calculate a difference between the direct-axis component Id_ref of the given current and the direct-axis component Id of the actual current to obtain a direct-axis component error value; perform a proportional integral adjustment on the direct-axis component error value to obtain a direct-axis current adjustment parameter Id1; obtain the direct-axis voltage adjustment parameter Vgd according to the direct-axis current adjustment parameter Id1, the direct-axis component Ud of the actual voltage, and the first decoupling quantity A1, wherein the above-described first decoupling quantity is obtained by decoupling the quadrature-axis component of the actual current, so that the quadrature-axis current is controlled by both the quadrature-axis voltage and the direct-axis voltage, and the same way for the direct-axis current. This indicates that there is coupling between the direct-axis and the quadrature-axis, and both of them are not independent. Therefore, in a specific implementation, the formula on which it is based upon obtaining the direct-axis voltage adjustment parameter Vgd according to the direct-axis current adjustment parameter Id1, the direct-axis component Ud of the actual voltage and the first decoupling quantity is based is: Vgd=Ud-Id1+A1; A1=ω*L*Iq, where ω is an angular velocity of alternating current and L is an inductance.

The third calculation unit 403 is configured to obtain the quadrature-axis voltage adjustment parameter Vgq according to the given voltage V_ref, the actual voltage U_inv_out_abc, the quadrature-axis component of the actual current and the quadrature-axis component Uq of the actual voltage. The third calculation unit 403 is specifically configured to: obtain the quadrature-axis component Iq_ref of a given current according to the given voltage V_ref and the actual voltage U_inv_out_abc, and specifically, calculate a difference between the given voltage V_ref and the actual voltage U_inv_out_abc to obtain a voltage error value, and perform a proportional integral adjustment on the voltage error value to obtain the quadrature-axis component Iq_ref of the given current; obtain the quadrature-axis current adjustment parameter Iq1 according to the quadrature-axis component Iq_ref of the given current and the quadrature-axis component of the actual current, and specifically, calculate a difference between the quadrature-axis component Iq_ref of the given current and the quadrature-axis component of the actual current to obtain the quadrature-axis component error value; perform a proportional integral adjustment on the quadrature-axis component error value to obtain a quadrature-axis current adjustment parameter Iq1; and obtain the quadrature-axis voltage adjustment parameter Vgq according to the quadrature-axis current adjustment parameter Iq1, the quadrature-axis component Uq of the actual voltage and the second decoupling quantity A2, wherein the above-described second decoupling quantity is obtained by decoupling the direct-axis component Id of the actual current, and according to the above as described, there is coupling between the direct-axis and the quadrature-axis and both of them are not independent. Therefore, when the quadrature-axis voltage adjustment parameter Vgq is obtained according to the quadrature-axis current adjustment parameter Iq1, the quadrature-axis component Uq of the actual voltage and the second decoupling quantity, the formula on which it is based is: Vgq=Uq+Iq1+A2; A2=ω*L*Id, where ω is an angular velocity of alternating current and L is an inductance.

The fourth operation unit 404 is configured to obtain an adjustment signal according to the direct-axis voltage adjustment parameter Vgd, the quadrature-axis voltage adjustment parameter Vgq and the positive sequence angle θpos of the energy storage converter described above. Specifically, based on the direct-axis voltage adjustment parameter, the quadrature-axis voltage adjustment parameter Vgq and the positive sequence angle θpos of the energy storage converter, inverse Park transform is performed to obtain the adjustment signal.

The adjusting unit 405 is configured to adjust the output parameter of the energy storage converter according to the above-described adjustment signal and the DC side voltage of the energy storage converter, and specifically, perform space vector pulse width modulation based on the adjustment signal and the DC side voltage of the energy storage converter to obtain a pulse signal; and adjust the duty ratio of the power switch in the energy storage converter according to the above-described pulse signal, so as to further adjust the output parameter of the energy storage converter.

Since the positive sequence angle θpos of the energy storage converter, the direct-axis component Id and the quadrature-axis component Iq of the actual current of the energy storage converter need to be used in the above-described steps, the above-described device further includes: a first transform module 50 configured to perform Clark transform of the above-described actual voltage U_inv_out_abc to obtain the α-axis voltage component Vα and the β-axis voltage component Vβ; perform phase-locking process based on the α-axis voltage component Vα and the β-axis voltage component Vβ to obtain the positive sequence angle θpos of the energy storage converter; and perform Park transform based on the α-axis voltage component Vα, the β-axis voltage component Vβ and the positive sequence angle θpos, to obtain the direct-axis component Ud of the actual voltage and the quadrature-axis component Uq of the actual voltage.

In some embodiments, the above-described device further includes: a second transform module 60 configured to perform Clark transform on the above-described actual current I_inv_out_abc to obtain the α-axis current component Iα and the β-axis current component Iβ; and perform Park transform based on the α-axis current component Iα, the β-axis current component U and the positive sequence angle θpos to obtain the direct-axis component Id of the actual current and the quadrature-axis component Iq of the actual current.

Before the grid is down, the grid voltage and the grid current may gradually decrease. Therefore, in some embodiments, the above-described device further includes: a grid-down determining module 70 configured to judge whether the grid voltage and/or the grid current meet(s) the preset conditions. If so, the grid being down is determined. If not, the grid being not down is determined. The above preset condition is that: the grid voltage is less than the first threshold (for example, 5V) or the grid current is less than the second threshold (for example, 5A), and at least one of them is true.

Embodiment 5

The present embodiment provides a method for on-grid and off-grid dispatch, which is applied to an energy storage air-conditioner. The structure of the energy storage air-conditioner is as shown in FIG. 2, which includes: a load 1, a grid 2, a device 3 for on-grid and off-grid dispatch, and an energy storage system 4, and a first switch K1 is provided between the load 1 and the grid 2. The energy storage system 4 includes an air-conditioning unit 41, a power generation unit 42 (for example, a photovoltaic panel) and an energy storage unit 43. The power generation unit 42 is connected to the air-conditioning unit 41 through the DC/AC converter, and the energy storage unit 43 is connected to the load 1 through the AC/DC converter, so as to supply power to the load 1 when the load 1 is off-grid. This AC/DC converter is an energy storage converter. The load 1 may include a first load 11, a second load 12 and a third load 13. A second switch K2 is provided between the first load 11 and the AC/DC converter, a third switch K3 is provided between the second load 12 and the AC/DC converter, and a fourth switch K4 is provided between the third load 13 and the AC/DC converter.

When the load is in an on-grid state, the device 3 for on-grid and off-grid dispatch obtains the grid voltage U_grid_abc and the grid current I_grid_abc, and the voltage U_load_abc and the current I_load_abc of the load 1 in real time. When the grid voltage U_grid_abc is less than the first threshold (for example, 0V) and/or the grid current I_grid_abc is less than the second threshold (for example, 0A), the device 3 for on-grid and off-grid dispatch determines that the grid is down, so as to cause the first switch K1 to be off, and cause the second switch K2, the third switch K3, and the fourth switch K4 to remain in the original state (for example, if the second switch K2 and the third switch K3 are on, and the fourth switch K4 is off before the grid is down, the device 3 for on-grid and off-grid dispatch causes the fourth switch K4 to remain off during a power interruption failure of the grid), and at the same time, cause the energy storage unit 43 to supply power to the load through the AC/DC converter.

After the AC/DC converter is controlled to supply power to the load, the given power P_ref and the given voltage V_ref are determined according to the voltage U_load_abc and the current I_load_abc of the load 1 obtained for the last time before the grid is down, and the actual voltage U_inv_out_abc and the actual current I_inv_out_abc outputted by the AC/DC converter are obtained. According to the given power P_ref and the given voltage V_ref, as well as the actual voltage U_inv_out_abc and the actual current I_inv_out_abc outputted by the AC/DC converter, the output parameter of the AC/DC converter are adjusted.

As shown in FIG. 4 mentioned above, the output parameter adjustment process includes:

In S1, the actual voltage U_inv_out_abc and the actual current I_inv_out_abc outputted by the AC/DC converter, i.e., the three-phase voltages Vab, Vbc and Vca and the three-phase currents Ia, Ib and Ic outputted by the AC/DC converter, are obtained by a hardware sampling circuit.

In S2, Clark transform is performed on the three-phase voltages Vab, Vbc, Vca and three-phase currents Ia, Ib, Ic described above respectively, so as to convert into the α-axis voltage component Vα and the β-axis voltage component Vβ, as well as the α-axis current component Iα and the β-axis current component U.

In S3, PLL phase-locking process is performed on the α-axis voltage component Vα and the β-axis voltage component Vβ to obtain the positive sequence angle θpos of the AC/DC converter.

In S4, Park transform is performed on the α-axis voltage component Vα and the β-axis voltage component Vβ, as well as the α-axis current component Iα and the β-axis current component Iβ respectively using the positive sequence angle θpos of the AC/DC converter, so as to convert into the direct-axis component Ud of the actual voltage, the quadrature-axis component Uq of the actual voltage, the direct-axis component Id of the actual current and the quadrature-axis component Iq of the actual current.

In S5, arithmetic subtraction is performed on the given power P_ref delivered by the device for on-grid and off-grid dispatch and the obtained actual power P_actual to obtain a power error value; and PI adjustment is performed on the power error value to obtain the direct-axis component Id_ref of the given current.

In S6, arithmetic subtraction is performed on the direct-axis component Id_ref of the given current and the direct-axis component Id of the actual current outputted by the AC/DC converter to obtain a direct-axis error value, and then PI adjustment is performed to obtain the direct-axis current adjustment parameter Id1.

In S7, arithmetic subtraction is performed on the given voltage V_ref delivered by the device for on-grid and off-grid dispatch and the actual voltage U_inv_out_abc detected by AC/DC to obtain a voltage error value; and PI adjustment is performed on the voltage error value to obtain the direct-axis component Iq_ref of the given current.

In S8, arithmetic subtraction is performed on the direct-axis component Iq_ref of the given current and the quadrature-axis component Iq of the actual current outputted by the AC/DC converter to obtain a quadrature-axis error value, and then PI adjustment is performed to obtain the quadrature-axis current adjustment parameter Iq1.

In S9, the quadrature component Iq of the actual current outputted by the AC/DC converter is decoupled, and the first decoupling quantity A1 is calculated, where A1=ω*L*Iq.

In S10, the direct-axis voltage adjustment parameter Vgd is calculated according to the formula Vgd=Ud-Id1+A1.

In S11, the direct-axis component Id of the actual current outputted by the AC/DC converter is decoupled, and the second decoupling quantity A2 is calculated, where A2=ω*L*Id.

In S12, according to the formula Vgq=Ud+Iq1+A2, the quadrature-axis voltage adjustment parameter Vgq is calculated.

In S13, inverse Park transform is performed on the direct-axis voltage adjustment parameter Vgd and the quadrature-axis voltage adjustment parameter Vgq by using the positive sequence angle θpos of the AC/DC converter to obtain an adjustment signal, wherein the adjustment signal includes an α-axis voltage adjustment quantity Uα and a β-axis voltage adjustment quantity Uβ.

In S14, the α-axis voltage adjustment quantity Uα and the β-axis voltage adjustment quantity Uβ are transmitted to the SVPWM module, and the SVPWM module combines the DC side voltage Ud of the AC/DC converter to perform voltage space vector modulation process and generate multiplex pulse control signals.

In S15, on and off of a plurality of power switches of the AC/DC converter are controlled according to the six-channel pulse control signals to adjust the output parameter of the AC/DC converter.

Figure 7:
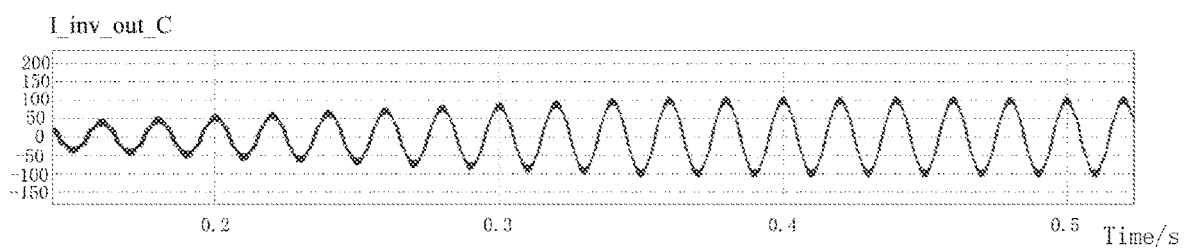
FIG. 7 is a waveform view of a C-phase current I_in-v_out_C of the AC/DC converter according to an embodiment of the present disclosure.

FIG. 7 is a waveform view of a C-phase current I_inv_out_C of the AC/DC converter according to an embodiment of the present disclosure, where the unit of the current is A (Ampere). As shown in FIG. 4, before 0.5 s, the C-phase current I_inv_out_C gradually increases, which indicates that the electric energy provided by the AC/DC converter to the load gradually increases.

Figure 8:
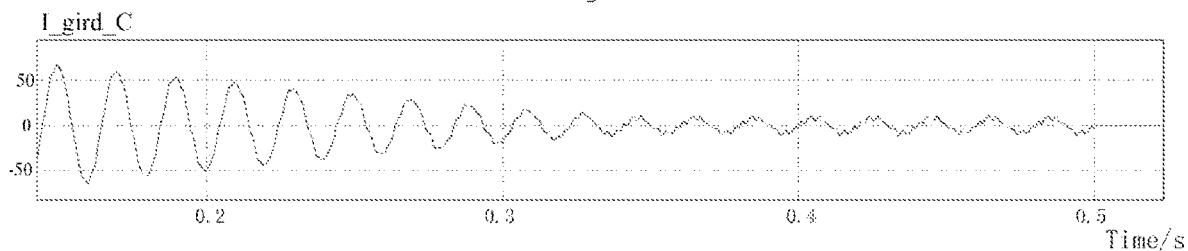
FIG. 8 is a waveform view of a C-phase current I_gird_C of a grid according to an embodiment of the present disclosure.

FIG. 8 is a waveform view of a C-phase current I_gird_C of a grid according to an embodiment of the present disclosure, where the unit of the current is A. As shown in FIG. 5, before 0.5 s, the C-phase current I_gird_C of the grid gradually decreases, and the electric energy provided to the load gradually decreases. At 0.5 s, power is completely interrupted to shift from an on-grid state to an off-grid state, and cease power supply to the local load so that the C-phase current of the grid drops to 0A.

Figure 9:
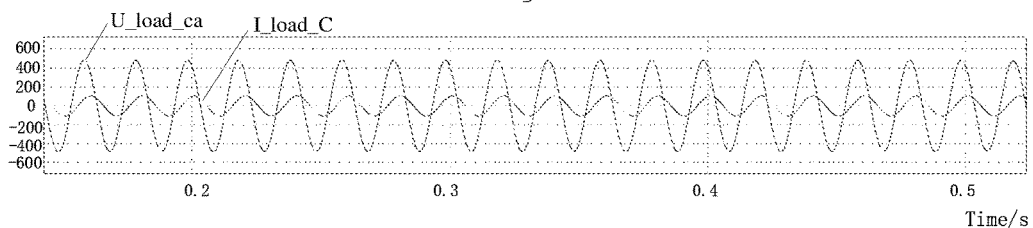
FIG. 9 is a waveform view of an AC voltage signal U_load_ca and a C-phase current signal I_load_C of the normalized load according to an embodiment of the present disclosure.

FIG. 9 is a waveform view of an AC voltage signal U_load_ca and a C-phase current signal I_load_C of the normalized load according to an embodiment of the present disclosure. As shown in FIG. 9, the AC voltage signal U_load_ca or the C-phase current signal I_load_C do not change, but remain stable during the whole operation period, and particularly at 0.5 s on-grid/off-grid shifting point. That is, at the off-grid moment, the voltage and the current signals of the load are seamlessly switched without fluctuation.

Embodiment 6

The present embodiment provides an energy storage air-conditioning system, which includes an energy storage converter. The energy storage air-conditioning system includes the above-described device for on-grid and off-grid dispatch for realizing seamless shifting between on-grid state and off-grid state and improving the stability of the system.

Embodiment 7

The present embodiment provides a computer readable storage medium having a computer program stored thereon that, when executed by a processor implements the method for on-grid and off-grid dispatch in the above-described embodiments.

The device embodiments described above are only schematic, wherein the units described as separate components may or may not be physically divided, and the components displayed as units may or may not be physical units, that is, they may be located in a place or distributed over multiple network units. Some or all of the modules may be selected to achieve the object of the solution in the present embodiment according to actual needs.

From the above illustrations of the embodiments, those skilled in the art may be explicitly appreciated that, each embodiment may be implemented by means of software and a requisite general-purpose hardware platform, and of course, it may also be implemented by hardware. Based on such understanding, part of the above-described technical solution that is essential or contributing to the relevant art may be embodied in the form of a software product. The computer software product may be stored in a computer-readable storage medium, such as ROM/RAM, magnetic disk and optical disk, and includes several instructions to cause a computer device (which may be a personal computer, a server, or a network device and the like) to implement the method described in various embodiments or some embodiments.

Finally, it is to be noted that, the above embodiments are only for describing the technical solution of the present disclosure, rather than limiting the same. Although the present disclosure has been described in detail in conjunction with the foregoing embodiments, those skilled in the art should understand that: it is still possible to modify the technical solutions recited in the foregoing various embodiments, or make equivalent substitutions to some of the technical features. Moreover, these modifications or substitutions do not make the essence of the corresponding technical solutions depart from the spirit and scope of the technical solutions in various embodiments of the present disclosure.

What is claimed is:

1. A method for on-grid and off-grid dispatch, comprising:
causing a load to be off-grid and causing an energy storage converter to supply power to the load after determining that grid is down;
determining a given power and a given voltage according to a voltage and a current of the load obtained for the last time before the grid is down; and obtaining an actual voltage and an actual current outputted by the energy storage converter; and
adjusting an output parameter of the energy storage converter according to the given power and the given voltage, as well as the actual voltage and the actual current outputted by the energy storage converter;
wherein the step of determining that the grid is down comprises:
judging whether a grid voltage meets a first preset condition and judging whether a grid current meets a second preset condition; and
determining that the grid is down if at least one of the grid voltages meeting the first preset condition and the grid current meeting the second preset condition is true, otherwise determining that the grid is not down.

2. The method according to claim 1, wherein the step of determining a given power and a given voltage according to a voltage and a current of the load obtained for the last time before the grid is down comprises:
calculating a product of a voltage, a current and a power factor of the load obtained for the last time before the grid is down to obtain a given power; and
determining a voltage of the load obtained for the last time before the grid is down as a given voltage.

3. The method according to claim 1, wherein the step of adjusting an output parameter of the energy storage converter according to the given power and the given voltage, as well as the actual voltage and the actual current outputted by the energy storage converter comprises:
calculating an actual power according to the actual voltage and the actual current outputted by the energy storage converter;
obtaining a direct-axis voltage adjustment parameter according to the given power, the actual power, a direct-axis component of the actual current and a direct-axis component of the actual voltage, and obtaining a quadrature-axis voltage adjustment parameter according to the given voltage, the actual voltage, a quadrature-axis component of the actual current and a quadrature-axis component of the actual voltage;
obtaining an adjustment signal according to the direct-axis voltage adjustment parameter, the quadrature-axis voltage adjustment parameter and a positive sequence angle of the energy storage converter; and
adjusting an output parameter of the energy storage converter according to the adjustment signal and a DC side voltage of the energy storage converter.

4. The method according to claim 3, wherein the step of obtaining a direct-axis voltage adjustment parameter according to the given power, the actual power, a direct-axis component of the actual current and a direct-axis component of the actual voltage comprises:
obtaining a direct-axis component of a given current according to the given power and the actual power;
obtaining a direct-axis current adjustment parameter according to the direct-axis component of the given current and the direct-axis component of the actual current; and
obtaining a direct-axis voltage adjustment parameter according to the direct-axis current adjustment parameter, the direct-axis component of the actual voltage and a first decoupling quantity, wherein the first decoupling quantity is obtained by decoupling the quadrature-axis component of the actual current.

5. The method according to claim 4, wherein the step of obtaining a direct-axis component of a given current according to the given power and the actual power comprises:
calculating a difference between the given power and the actual power to obtain a power error value; and
performing proportional integral adjustment on the power error value to obtain a direct-axis component of the given current.

6. The method according to claim 4, wherein the step of obtaining a direct-axis current adjustment parameter according to the direct-axis component of the given current and the direct-axis component of the actual current comprises:
calculating a difference between the direct-axis component of the given current and the direct-axis component of the actual current to obtain a direct-axis component error value; and
performing proportional integral adjustment on the direct-axis component error value to obtain the direct-axis current adjustment parameter.

7. The method according to claim 4, wherein a formula on which the step of obtaining the direct-axis voltage adjustment parameter according to the direct-axis current adjustment parameter, a direct-axis component of the actual voltage and a first decoupling quantity is based is:

$$Vgd = Ud - Id1 + A1,$$

where Vgd is the direct-axis voltage adjustment parameter, Id1 is the direct-axis current adjustment parameter, Ud is the direct-axis component of the actual voltage, and A1 is the first decoupling quantity.

8. The method according to claim 3, wherein the step of obtaining a quadrature-axis voltage adjustment parameter according to the given voltage, the actual voltage, a quadrature-axis component of the actual current and a quadrature-axis component of the actual voltage comprises:
obtaining a quadrature-axis component of a given current according to the given voltage and the actual voltage;
obtaining a quadrature-axis current adjustment parameter according to the quadrature-axis component of the given current and the quadrature-axis component of the actual current; and
obtaining the quadrature-axis voltage adjustment parameter according to the quadrature-axis current adjustment parameter, the quadrature-axis component of the actual voltage and a second decoupling quantity, wherein the second decoupling quantity is obtained by decoupling the direct-axis component of the actual current.

9. The method according to claim 8, wherein the step of obtaining a quadrature-axis component of a given current according to the given voltage and the actual voltage comprises:
calculating a difference between the given voltage and the actual voltage to obtain a voltage error value; and
performing proportional integral adjustment on the voltage error value to obtain a quadrature-axis component of the given current.

10. The method according to claim 8, wherein the step of obtaining a quadrature-axis current adjustment parameter according to the quadrature-axis component of the given current and the quadrature-axis component of the actual current comprises:
calculating a difference between the quadrature-axis component of the given current and the quadrature-axis component of the actual current to obtain a quadrature-axis component error value; and
performing proportional integral adjustment on the quadrature-axis component error value to obtain the quadrature-axis current adjustment parameter.

11. The method according to claim 8, wherein a formula on which the step of obtaining the quadrature-axis voltage adjustment parameter according to the quadrature-axis current adjustment parameter, the quadrature-axis component of the actual voltage and a second decoupling quantity is based is:

$$Vgq = Uq + Iq1 + A2,$$

where Vgq is the quadrature-axis voltage adjustment parameter, Iq1 is the quadrature-axis current adjustment parameter, Uq is the quadrature-axis component of the actual voltage, and A2 is the second decoupling quantity.

12. The method according to claim 3, wherein the step of obtaining an adjustment signal according to the direct-axis voltage adjustment parameter, the quadrature-axis voltage adjustment parameter and a positive sequence angle of the energy storage converter comprises:
performing inverse Park transform based on the direct-axis voltage adjustment parameter, the quadrature-axis voltage adjustment parameter and a positive sequence angle of the energy storage converter to obtain an adjustment signal.

13. The method according to claim 3, wherein the step of adjusting an output parameter of the energy storage converter according to the adjustment signal and a DC side voltage of the energy storage converter comprises:
performing space vector pulse width modulation based on the adjustment signal and a DC side voltage of the energy storage converter to obtain a pulse signal; and
adjusting a duty ratio of a power switch in the energy storage converter according to the pulse signal so as to adjust an output parameter of the energy storage converter.

14. The method according to claim 1, wherein after the step of obtaining an actual voltage and an actual current outputted by the energy storage converter, the method further comprises:
performing Clark transform on the actual voltage to obtain an $\alpha$-axis voltage component and a $\beta$-axis voltage component;
performing phase-locking process based on the $\alpha$-axis voltage component and the $\beta$-axis voltage component to obtain a positive sequence angle of the energy storage converter; and
performing Park transform based on the $\alpha$-axis voltage component, the $\beta$-axis voltage component and the positive sequence angle to obtain the direct-axis component of the actual voltage and the quadrature-axis component of the actual voltage.

15. The method according to claim 14, further comprising:
performing Clark transform on the actual current to obtain an $\alpha$-axis current component and a $\beta$-axis current component; and
performing Park transform based on the $\alpha$-axis current component, the $\beta$-axis current component and the positive sequence angle to obtain the direct-axis component of the actual current and the quadrature-axis component of the actual current.

16. The method according to claim 1, wherein the first preset condition is that the grid voltage is less than a first threshold, and the second preset condition is that the grid current is less than a second threshold.

17. A device for on-grid and off-grid dispatch applied to the method for on-grid and off-grid dispatch according to claim 1, wherein the device comprises:
a control module configured to cause a load to be off-grid and cause an energy storage converter to supply power to the load after determining that the grid is down;
a parameter determining module configured to determine a given power and a given voltage according to a voltage and a current of the load obtained for the last time before the grid is down;
an obtaining module configured to obtain an actual voltage and an actual current outputted by the energy storage converter; and
an adjusting module configured to adjust an output parameter of the energy storage converter according to the given power and the given voltage, as well as the actual voltage and the actual current outputted by the energy storage converter.

18. An energy storage air-conditioning system, comprising an energy storage converter and the device for on-grid and off-grid dispatch according to claim 17.

19. A non-transitory computer readable storage medium having a computer program stored thereon that, when executed by a processor, implements the method according to claim 1.

* * * * *